Inventors
Ralph B. Jerman
Peter F. Santoro
Henri F. vanKessel
Attorney

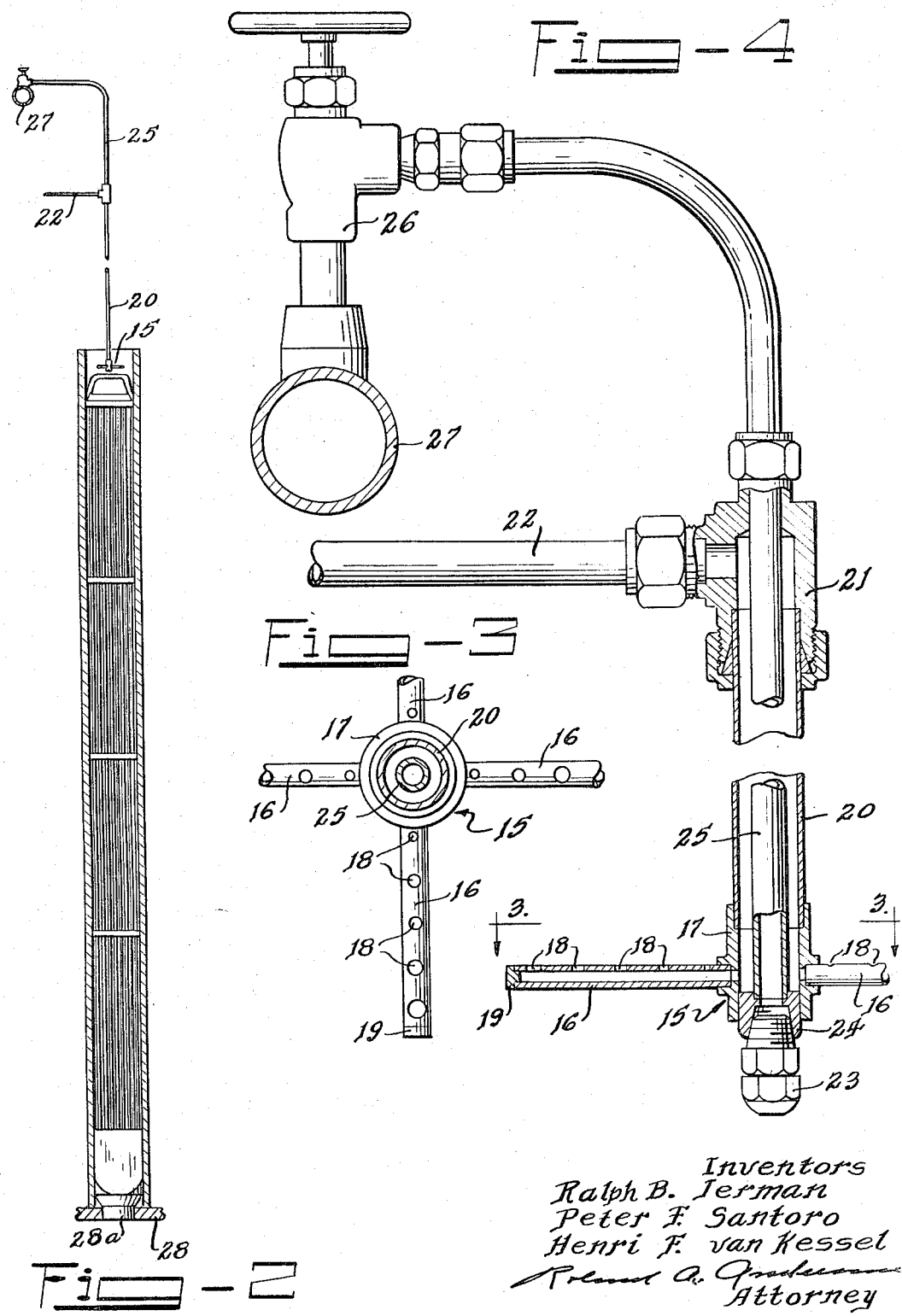

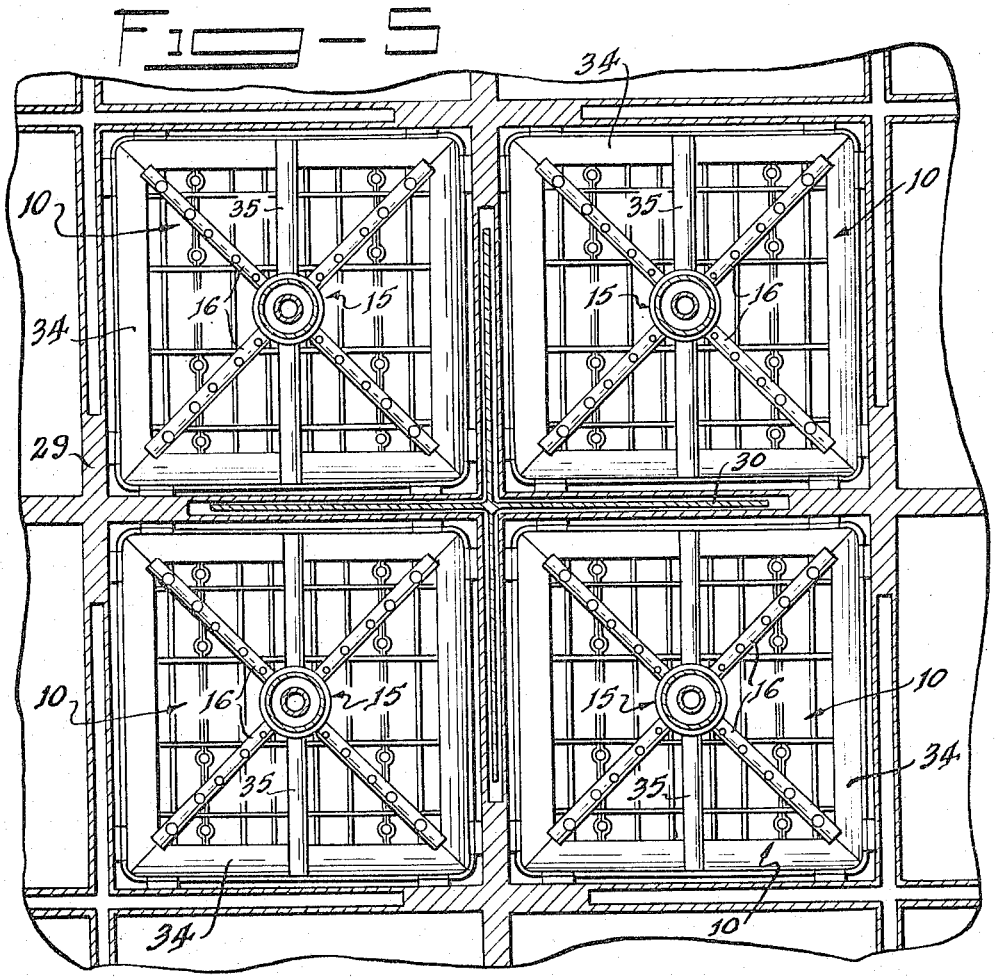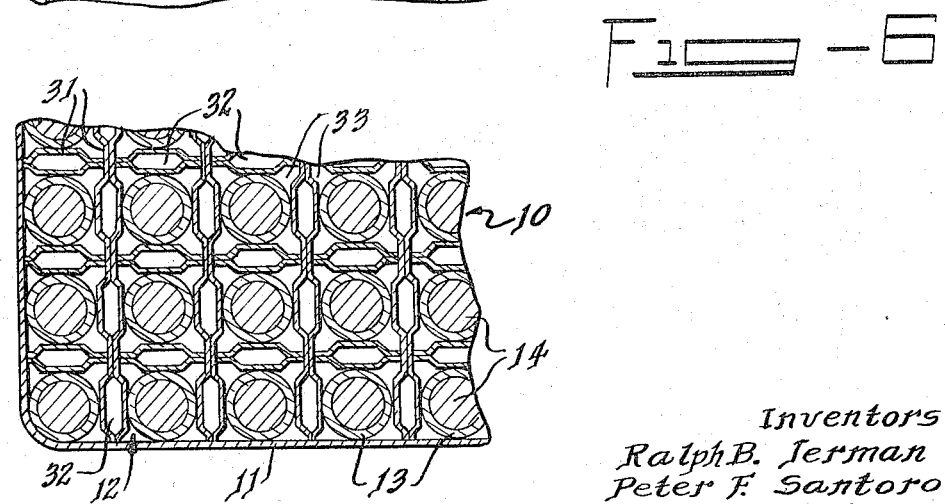

3,300,388
IN-CORE SAMPLING AND SPRAY DEVICE FOR NUCLEAR REACTORS
Ralph B. Jerman, Milwaukee, Wis., Peter F. Santoro, Hartford, Conn., and Henri F. van Kessel, Wheaton, Md., assignors to the United States of America as represented by the United States Atomic Energy Commission
Filed Sept. 8, 1965, Ser. No. 485,959
3 Claims. (Cl. 176—19)

The invention described herein was made in the course of, or under, a contract with the U.S. Atomic Energy Commission.

This invention relates to an apparatus for detecting fuel-element failure in a nuclear reactor. More particularly, the invention relates to a probe for fission gases escaping from fuel elements in a boiling-water reactor.

When a fuel element of a nuclear reactor fails during reactor operation through the escape of fission products from the fuel element, it is, of course, desirable to replace the faulty fuel element. The mere fact of fuel-element failure is easy enough to detect; the difficult part is to establish the location of the failure, particularly where the failed fuel element is one of a large number of fuel elements in an assembly.

A typical boiling-water reactor is formed of a plurality of fuel assemblies each composed of a large number of jacketed fuel elements in the shape of rods or pins and an external casing for all the fuel elements of the assembly. Water being converted to steam flows over the fuel elements in a plurality of separate paths through the assemblies, one path to an assembly. Theoretically, the provision of a plurality of probes, one to a fuel-element assembly makes it easy to detect which assembly has a failed fuel element. As a practical matter, however, this has in the past, proved extremely difficult, if not impossible.

When a given fuel element of a large number of fuel elements of an assembly fails by escape of fission products through the jacket of the element, the probability that fission products will find their way into a probe is dependent on how near the probe is to the line of flow of water from over the faulty fuel element. Thus if the faulty fuel element is at a corner or side of the assembly and the probe is located at the centerline of the assembly, the probe may easily fail to push up any of the escaping fission products. Moreover, even if there is general alignment of the escaping fission products and the probe, the fission products may slip past the probe without being picked up.

In the drawings:

FIG. 2 is an elevation of the fuel-element assembly and the probe;

FIG. 3 is a fragmentary plan view, partly in section, of the probe;

FIG. 4 is a fragmentary sectional view showing how the probe is connected with an emergency cooling nozzle;

FIG. 5 is a fragmentary plan view, partly in section, showing a plurality of adjacent fuel-element assemblies and their probes; and FIG. 6 is a fragmentary sectional view of a fuel-element assembly, showing a grid for holding the fuel elements in spaced relationship.

Figure 1:
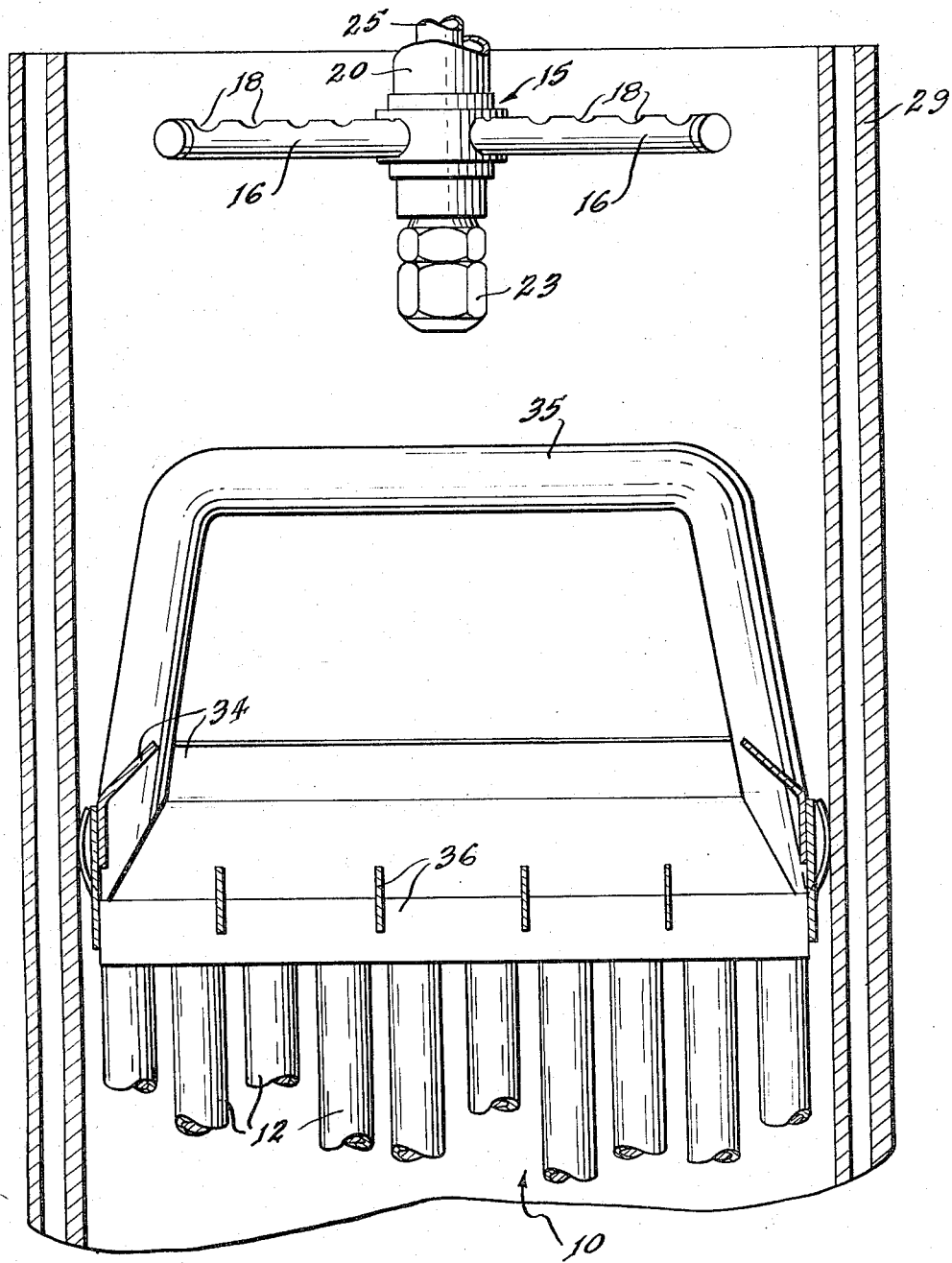
FIG. 1 is a fragmentary sectional view of a nuclear reactor, showing a fuel-element assembly and the probe of the present invention associated therewith.

As shown in FIG. 5, a nuclear reactor includes a plurality of juxtaposed fuel-element assemblies 10. As shown in FIGS. 1 and 6, each assembly is composed of a casing 11 and a plurality of spaced parallel rod-like fuel elements 12 contained in the casing. Each fuel element 12 is composed of a corrosion-resistant jacket 13 and a core 14 of fissionable material.

Each assembly 10 is provided with a probe 15 of the present invention located over the assembly. As shown in FIGS. 3 and 4, each probe 10 is formed of a plurality of horizontal tubes 16 extending radially outward from a fitting 17 and being provided with a plurality of openings 18 which are distributed along the length of their top, or downstream, sides and increase in size from a minimum at the inner ends of the tubes 16 at the fitting 17 to a maximum at their outer ends, which are closed by plugs 19. As shown in FIG. 5, the probe tubes 16 are four in number and extend diagonally of a given fuel-element assembly 10, which is square. Support for the probe 15 is provided by a vertical tubular line 20, which has its lower end connected to the fitting 17 and its upper end to a fitting 21, which is in turn connected to a horizontal tube 22.

Located centrally of each probe 15, is an emergency spray nozzle 23 for use with the associated fuel-element assembly 10. The nozzle 23 is mounted in a plug 24 connected to the fitting and is supplied by a tubular line 25, which extends upward through, and in spaced relation to, the vertical line 20 and through the fitting 21 and thence horizontally to a valve 26, which is mounted on, and connected to, a header 27.

As shown in FIG. 2, each assembly 10 rests on a bottom plate 28 of the reactor, by means of a reduced portion 28a of the assembly fitting in an opening in the bottom plate.

As shown in FIG. 5, the assemblies 10 are laterally supported in individual shrouds that are formed of a deep or long honeycomb structure 29, which has cruciform openings receiving cruciform control rods 30 which are moved vertically into the reactor through means (not shown) located below the reactor. As shown in FIG. 6, the fuel elements 12 of each assembly are maintained in spaced parallel relationship by grids 31, which are spaced longitudinally of the fuel elements and have openings 32 and corner spaces 33 through which the water being converted to steam flows as an incident to moving lengthwise over the fuel elements 12. Each assembly 10 is provided at its top with a baffle 34 which extends along the four sides of the assembly at about 45° to its axis. The baffle 34 acts on the water emerging from the top of the fuel elements 12 so that the probe 15 can more effectively pick up any fission products. Each assembly 10 has at its upper end a handle 35 for lifting the assembly. The handle 35 is located above the baffle 34 and below the probe 15. Each assembly also has at its top a grid-like structure 36 for holding down the fuel elements 12.

In operation of the reactor, water is flowed into the lower ends of the assemblies 10 and up through them. The water flows over the fuel elements 12 and is heated thereby to form steam. Above the assemblies 10 the steam is separated by means (not shown) from water still remaining in the steam and is then conveyed to a superheater (not shown) or utilized in wet form. The water separated from the steam is returned by means (not shown) for another passage through the fuel-element assemblies 10.

When a too high level of radioactivity is detected indicating fuel-element failure somewhere, the probe 15 of the present invention is utilized. A sample is taken from each assembly 10 and subjected to a counter. When this is to be done for a given assembly 10, the associated probe 15 is connected by opening a valve (not shown), so that a sample composed of steam, water, and fission products in gaseous form is taken through the openings 18 of the probe 15 into the tubes 16 thereof and led out through the fitting 17, line 20, fitting 21, and tube 22. The sample thus taken is treated by apparatuses (not shown) that cool it, reduces its pressure, and subject it to a stripping gas. The mixture of stripping gas and fission-product gas is dried by cooling and then brought to an electrostatic precipitator in which high voltage is applied to attract positively charged cesium and rubidium ions to a grounded wire. These ions are the decay products of the fission gases xenon and krypton. Thereafter the wire is removed to a beta-sensitive scintillation detector.

Extensive testing has shown the probe 15 is best suited of various probes to pick up fission products wherever there has been a failure of a fuel element 12 of the assembly 10 under consideration. This is true regardless of the location of the fuel element 12 in the assembly, whether at a corner, at one side, or near the center. The arrangement of the sampling holes 18 on the upper or downstream side of the tubes 16 extending toward the corners of the assembly 10 is well suited to take samples from the mixture of water, steam, and fission-product gas as it moves under the influence of the grids 31, the hold-down structure 35, and the baffle 34.

An example of fuel-element assembly 10 tested successfully under simulated conditions has 100 fuel elements 12, 6′ long, .565″ from centerline to centerline, and .396″ diameter; separating grids 31 spaced 6″ along the length of the fuel elements 10; five openings 18 on each tube 16 spaced ½″ from one another and being of $\frac{1}{16}''$, $\frac{1}{8}''$, $\frac{1}{8}''$, $\frac{9}{64}''$, and $\frac{11}{64}''$, diameter; each tube 18 of ¼″ outside diameter and each plug 19 having its outer end 3″ from the center of fitting 17.

It is understood that the invention is not to be limited by the details given herein but that it may be modified within the scope of the appended claims.

The embodiments of the invention in which an exclusive property or privilege is claimed are defined as follows:

1. The combination with an assembly comprising a long casing of rectangular cross section, a plurality of long rod-like elements of nuclear fuel positioned in the casing in spaced, parallel, side-by-side relation, a plurality of grids spaced along the elements and applied thereto so as to hold them in spaced relation to one another in the casing, and a hold-down structure applied to the elements at the exit end of the assembly; of a probe comprising a plurality of tubes located beyond the exit end of the assembly and extending radially outward from a region generally on the axis of the assembly, each tube being closed at its outer end and having on its upstream side away from the assembly a plurality of openings spaced lengthwise of the tube, and a tubular line connected with the inner ends of the tubes and extending therefrom generally on the axis of the assembly away from the upstream side thereof; and a baffle extending across the four sides of the assembly at the end thereof and being inclined to the axis of the assembly.

2. The combination specified in claim 1, the casing being square in cross section, the tubes being four in number and extending diagonally of the casing.

3. The combination specified in claim 2 and further including a fitting connecting the tubes and line, an emergency spray nozzle for the assembly mounted in the fitting, and a second tubular line connected with the nozzle and extending therefrom along and within the first tubular line.

References Cited by the Examiner
UNITED STATES PATENTS

| | | | |
|---|---|---|---|
| 1,677,485 | 7/1928 | Nelson | 239—567 |
| 1,776,714 | 9/1930 | Armstrong | 239—567 |
| 2,661,240 | 12/1952 | Salomonsson | 239—557 |
| 3,069,339 | 12/1962 | Jacobs | 176—19 |
| 3,070,532 | 12/1962 | Zebroski | 176—19 |
| 3,234,101 | 2/1966 | Berthod | 176—19 |

CARL D. QUARFORTH, *Primary Examiner.*

L. DEWAYNE RUTLEDGE, *Examiner.*

H. E. BEHREND, *Assistant Examiner.*